United States Patent
Tenbroek et al.

(10) Patent No.: US 10,042,798 B2
(45) Date of Patent: Aug. 7, 2018

(54) SYSTEM COMPRISING A MASTER DEVICE AND A SLAVE DEVICE HAVING MULTIPLE INTEGRATED CIRCUIT DIE, WIRELESS COMMUNICATION UNIT AND METHOD THEREFOR

(71) Applicant: MEDIATEK Singapore Pte. Ltd., Singapore (SG)

(72) Inventors: Bernard Mark Tenbroek, Kent (GB); David Stephen Ivory, Cambridge (GB)

(73) Assignee: MediaTek Singapore Pte. Ltd., Solaris (SG)

( * ) Notice: Subject to any disclaimer, the term of this patent is extended or adjusted under 35 U.S.C. 154(b) by 243 days.

(21) Appl. No.: 15/177,557

(22) Filed: Jun. 9, 2016

(65) Prior Publication Data
US 2017/0192918 A1    Jul. 6, 2017

Related U.S. Application Data

(60) Provisional application No. 62/272,723, filed on Dec. 30, 2015.

(51) Int. Cl.
G06F 13/00 (2006.01)
G06F 15/173 (2006.01)
G06F 13/364 (2006.01)
G06F 13/42 (2006.01)

(52) U.S. Cl.
CPC ........ *G06F 13/364* (2013.01); *G06F 13/4291* (2013.01)

(58) Field of Classification Search
None
See application file for complete search history.

(56) References Cited

U.S. PATENT DOCUMENTS

| | | | |
|---|---|---|---|
| 5,987,556 A * | 11/1999 | Nakagawa | G06F 9/3879 710/260 |
| 8,688,865 B2 | 4/2014 | Luo | |
| 2012/0129301 A1* | 5/2012 | Or-Bach | H01L 21/6835 438/129 |
| 2013/0135043 A1 | 5/2013 | Hietala et al. | |
| 2014/0210668 A1* | 7/2014 | Wang | H01Q 3/34 342/372 |

(Continued)

*Primary Examiner* — Michael Sun
(74) *Attorney, Agent, or Firm* — Optimus Patents US, LLC

(57) ABSTRACT

A system is described that comprises: a master device and a slave device. The slave device comprises: a first die comprising an interface comprising a decoder configured to support a MIPI™ RFFE slave protocol; at least one second die comprising a simplified address decoder, operably coupled to the first die; and a shared control bus that is configured to support at least a clock signal and a data signal shared between the master device and the at least one second die on the slave device. The interface of the first die is configured to generate at least one circuit enable signal, routed to the at least one second die. The simplified address decoder is configured to process the clock signal and the data signal in response to the at least one circuit enable signal. In this manner, by partitioning the protocol handling to a protocol decoder in a first die, and one or more second die that support a simplified address decoder, the first die is able to individually select the die to receive a data frame by generating and routing the enable signal.

20 Claims, 6 Drawing Sheets

(56) References Cited

U.S. PATENT DOCUMENTS

| | | | |
|---|---|---|---|
| 2015/0169482 A1* | 6/2015 | Ngo | G06F 13/3625 |
| | | | 710/110 |
| 2015/0193321 A1* | 7/2015 | Ngo | G06F 11/3027 |
| | | | 714/758 |
| 2016/0148656 A1* | 5/2016 | Kim | H01L 25/0657 |
| | | | 365/51 |
| 2016/0181214 A1* | 6/2016 | Oh | H01L 45/04 |
| | | | 257/777 |
| 2017/0124008 A1* | 5/2017 | Chen | G06F 13/36 |
| 2017/0124013 A1* | 5/2017 | Vaillancourt | G06F 13/4022 |

* cited by examiner

FIG. 1 - Prior Art

SYSTEM COMPRISING A MASTER DEVICE AND A SLAVE DEVICE HAVING MULTIPLE INTEGRATED CIRCUIT DIE, WIRELESS COMMUNICATION UNIT AND METHOD THEREFOR

FIELD OF THE INVENTION

The field of this invention relates generally to the field of electronic devices that support mobile industry processor interface (MIPI™) protocols. In particular, the field of this invention relates to devices that comprise multiple die, configurable across one or more slave devices coupled to a master device and supporting the MIPI™ protocols, such as a wireless communication unit having a MIPI™ radio frequency front-end (RFFE) interface.

BACKGROUND OF THE INVENTION

As new generations of handsets, and other wireless communication devices become embedded with more applications and complexity, there is a need for ever more integration. The trend in mobile radio communications is towards complex multi-radio systems comprised of several parallel transceivers. This implies a leap in complexity of the radio frequency (RF) front-end (FE) design. The RF circuits of wireless communication devices are particularly difficult to integrate, due to the need for high power radio frequency circuits and components, which are inherently hardware rather than software or firmware based.

An RF Front-End Control Interface (hereinafter referred to as 'RFFE') specification is one of a number of specifications that has been developed by the mobile industry processor interface (MIPI™) Alliance, in order to offer a common and widespread approach to controlling RF components and circuits employed in front-end devices. There are a variety of RF front-end devices, including Power Amplifiers (PA), Low-Noise Amplifiers (LNA), filters, switches, power management modules, antenna tuners and sensors. These functions may be located either in separate devices or integrated into a single device, depending on the application. RF front-end devices are often developed in process technologies, where diverse technology choices are necessary to meet the functional and performance requirements of the application and the different front-end circuits. Often, in some process technologies used for RF front-end applications, the implementation of additional (controlling) digital logic is costly and technologically problematic. A typical solution to the control of many RF components and circuits is to implement a master (control) device and one or multiple slave devices that are controlled by, or responsive to, the master device. Consequently, simplicity has been a core driver in RFFE development. A major factor in a RFFE design is to offer options to reduce slave control complexity to a minimum (for example to target approximately 300 to 500 gates). Thus, the MIPI™ RFFE specification, has been designed and positioned at the low complexity end of all interfaces, and is optimized for Slave device implementation simplicity, without sacrificing a broad set of features.

Referring to FIG. 1, the known MIPI™ RFFE architecture is illustrated, whereby a master device 156 within a communication unit 100 is arranged to communicate with a plurality of slave devices 130 via a shared serial control bus, where multiple slaves are connected to the same bus in parallel. The MIPI™ RFFE supporting devices are interconnected by a system clock 132, system data 134 and a shared (between the multiple die) interface supply voltage (VIO) (not shown) on the shared serial control bus. Of particular note is that a full MIPI™ slave interface 152a, 152b, 152c is implemented on each slave device 158a, 158b, 158c.

A MIPI™ RFFE master interface 110 of the master device 156 is in data communication with corresponding MIPI™ RFFE slave interfaces 152a, 152b, 152c of each slave device, namely first slave device 158a, second slave device 158b, and third slave device 158c, through a bus carrying system data 134. The processing of the data in each of the MIPI™ RFFE slave interfaces 152a, 152b, 152c of the slave devices 158a, 158b, 158c, is achieved using timing from the system clock 132. Each MIPI™ RFFE slave interface 152a, 152b, 152c includes a protocol circuit 120 that includes a protocol decoder 122 to decode the full MIPI™ protocol on a received data frame and an address decoder 124, for example with a device identifier that is used to determine whether data, commands, etc., on the shared data line 134 are intended for use by the particular slave device 158a, 158b, 158c. The protocol circuit further includes a full set of address registers 126 coupled to the address decoder 124.

Such an architecture is used as a traditional solution for a master device to control multiple slave devices on multiple die. As shown, each die comprises its own (i.e. duplicated) MIPI™ interface, each with a full protocol decoder to support a large number of slave features, including: MIPI™ RFFE state control, VIO controlled reset sequence, sequence start detect, slave identity decode, command decode, broadcast access, error handling. In addition, each die may be required to support a number of optional features, including: multiple word length access, bursts, read-back, programmable unique slave identifier (USID), triggered access. Thus, the known approach to decode everything on each die, coupled to an architecture that is required to distribute all of the data to all die, leads to more logic required in the die and too many communication/data lines between die. This known approach, therefore, increases the die size significantly, which results in increased cost.

In an architecture that implements MIPI™ RFFE, a further problem exists in that the die to support RF technology are typically more complex, and notably the die may use different processing technologies. For example, an architecture designer will not want large digital logic circuits on all die, as some die will inherently be specific to support RF technology, e.g. GaAs.

Therefore, known techniques for integrating MIPI™ RFFE modules that include multiple die would benefit from improved efficiency, reduced die size and reduced power consumption.

SUMMARY OF THE INVENTION

Accordingly, the invention seeks to mitigate, alleviate or eliminate one or more of the above mentioned disadvantages, either singly or in any combination. Aspects of the invention provide a system comprising multiple die, a wireless communication unit and a method of operating a system comprising multiple die having a first and at least one second die, as described in the appended claims.

In accordance with a first aspect of the invention, a system is described that comprises: a master device; and a slave device. The slave device comprises: a first die comprising an interface comprising a decoder configured to support a MIPI™ RFFE slave protocol; at least one second die, comprising a simplified address decoder, operably coupled to the first die; and a shared control bus that is configured to support at least a clock signal and a data signal share between the master device and the at least one second die on the slave device. The interface of the slave device is configured to generate at least one circuit enable signal routed to at least one second die and the simplified address decoder is configured to process the clock signal and the data signal in response to the at least one circuit enable signal.

In this manner, by partitioning the protocol handling to a protocol decoder in a first die, and one or more second die that include a simplified address decoder, the first die is able to individually select the die that is/are to receive a data frame by generating and routing the enable signal. Furthermore, the at least one second die is significantly simplified by including a simplified address decoder, rather than a full protocol decoder, that can be selectively addressed by an enable signal to decode the system clock and data signals.

In some optional examples, the at least one second die is enabled to decode the data signal in response to the at least one circuit enable signal. In this manner, processing of input frames by the second die is limited to responding to the enable signal generated by the first die. In this manner, the second die no longer requires a protocol header, and can function with just an address decoder with associated registers when processing the data signal.

In some optional examples, the slave decoder may be implemented on only the first die and configured to decode a first part of an input frame of the data signal comprising a command frame comprising at least one of a synchronisation field, a slave address field, and at least one command. In this manner, an initial portion of a MIPI™ frame may be decoded by a MIPI™ interface on a first die in order to determine whether the second die requires the data in the MIPI™ frame, and if so a suitable enable signal is generated and routed to the second die. In some examples, a decoding of the slave address field of the MIPI™ frame provides an indication of the second die that requires the data in the MIPI™ frame, and the enable signal is generated in response thereto.

In some optional examples, a second part of the input frame of the data signal may comprise an address field and a data field to be decoded by the at least one selected second die. In this manner, the first part of the input frame need not be decoded by the second die. Also, in this manner, the second part of the input frame need not be decoded by the first die.

In some optional examples, the first die may comprise a logic circuit coupled to the MIPI™ RFFE interface and configured to receive the clock signal and data signal from a master device via the shared bus and provide a gated version of the clock signal and data signal to the at least one second die. In some examples the logic circuit may comprise logic AND gates coupled respectively to the system clock and system data, with the second (controlling) pin of the AND gates being subject to a control signal generated by the MIPI™ RFFE interface. In this manner, gated control of the data signal and clock signal may be provided to the second die.

In some optional examples, the system may comprise multiple second die, where the at least one second die comprises at least one storage element (such as one or more registers) coupled to a respective simplified address decoder. In this manner, the second die need only maintain the registers that are dedicated for the associated address(es) of the second die, rather than the known art of maintaining a full set of registers.

In accordance with a second aspect of the invention, a method of operating a system comprising a master device and at least one slave device is described. The at least one slave device comprises a first die comprising a decoder configured to support a MIPI™ RFFE slave protocol and at least one second die comprising a simplified address decoder and operably coupled to the first die. The method comprises: supporting at least a clock signal and a data signal between the master device and the at least one second die on the slave device via a shared control bus; processing the data signal at the slave decoder on the first die to determine whether the at least one second die is to decode the data signal; generating, at the first die, a circuit enable signal; routing the circuit enable signal to the at least one second die; and processing the clock signal and the data signal by the simplified address decoder in response to the circuit enable signal.

In some optional examples, the method may further comprise decoding a first part of an input frame of the data signal by the slave decoder; identifying whether the at least one second die is to decode a second part of the input frame based on the decoded first part; and generating the at least one circuit enable signal in response thereto.

In some optional examples, the method may further comprise enabling the at least one second die to decode the data signal in response to the at least one circuit enable signal.

In accordance with a third aspect of the invention, a wireless communication unit is described that comprises a master device and a slave device. The slave device comprises: a first die comprising a radio frequency front end, RFFE, interface comprising a slave decoder configured to support a MIPI™ slave protocol; at least one second die, comprising a simplified address decoder, operably coupled to the first die; and a shared control bus that is configured to support at least a clock signal and a data signal between the master device and the at least one second die on the slave device. The RFFE interface of the first die of the slave device is configured to generate at least one circuit enable signal routed to the at least one second die and the simplified address decoder is configured to process the clock signal and the data signal in response to the at least one circuit enable signal.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Figure 5:
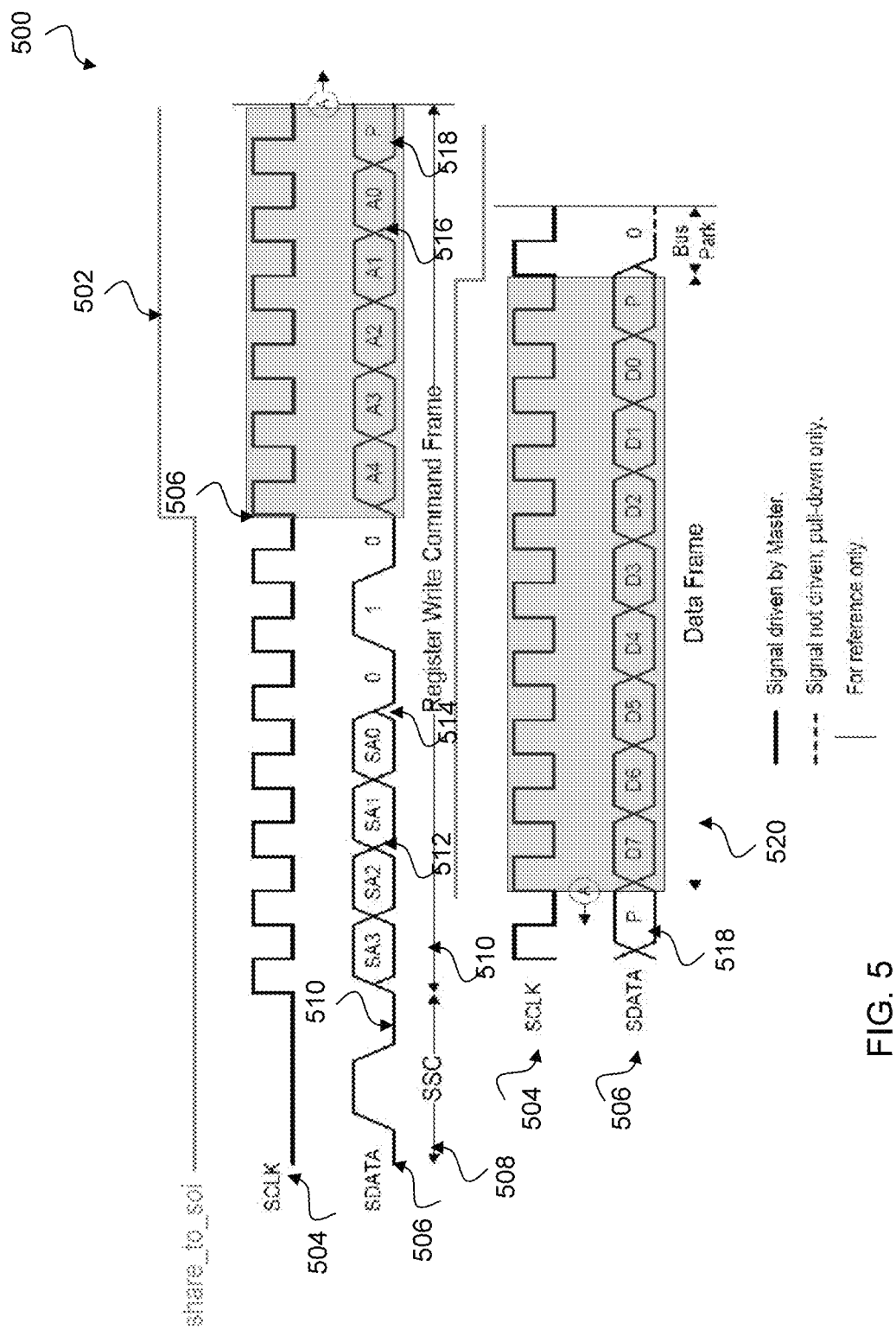
FIG. 5 illustrates an example frame structure and gating of control signals in an MIPI™ RFFE interface architecture according to example embodiments of the invention.

Examples of the invention will be described in terms of a data processing system, such as found in a wireless communication unit such as a smartphone, comprising a master device and one or more slave device(s). Such slave devices may comprise multiple die, e.g. a first die that includes a MIPI™ radio frequency front end RFFE interface, and a second die that includes a simplified address decoder. Although examples of the invention will be described in terms of a MIPI RFFE register write frame, as shown in FIG. 5, it is envisaged that the concepts described herein may be applied to any MIPI RFFE frame structure. Although examples of the invention will be described in terms of one or more integrated circuits for use in such a wireless communication unit, it will be appreciated by a skilled artisan that the inventive concept herein described may be embodied in any type of integrated circuit, electronic device that employs multiple die and could benefit from reduced die size and/or cost.

Figure 2:
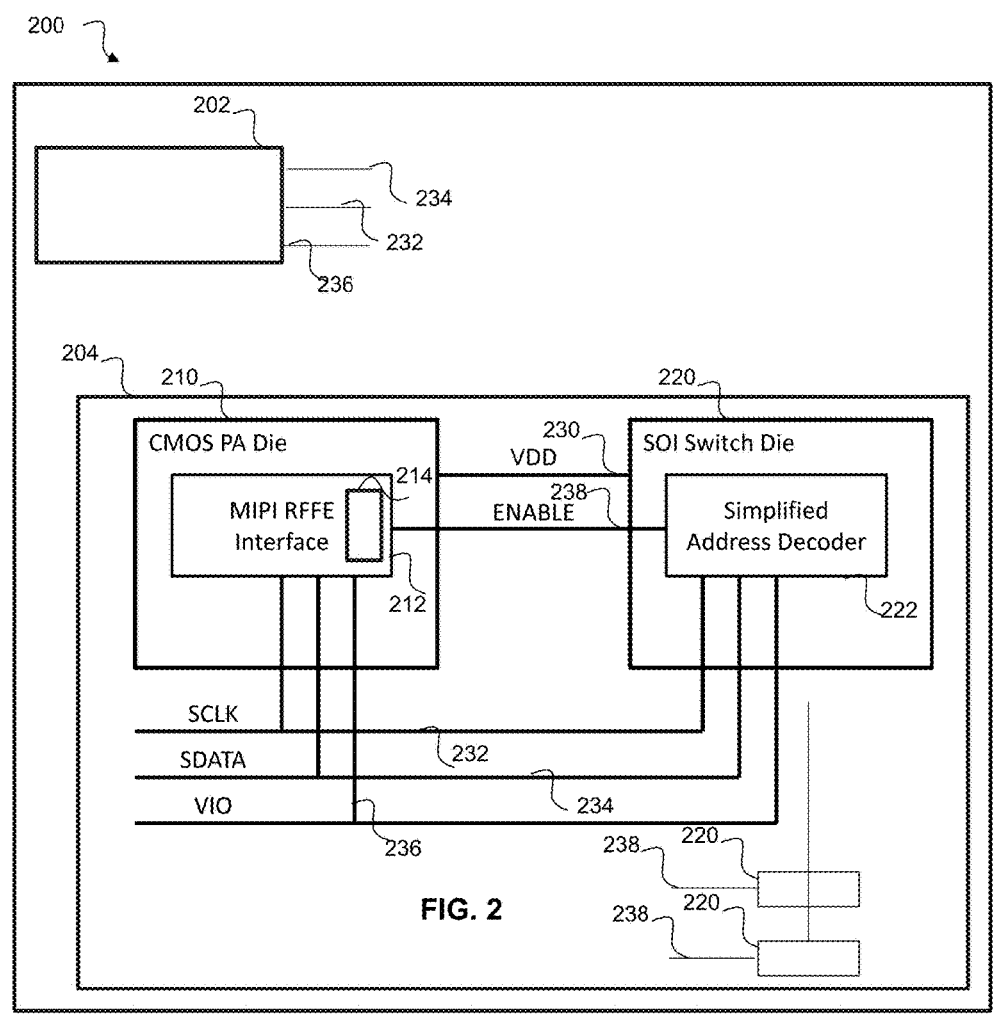
FIG. 2 illustrates a wireless communication unit supporting a MIPI™ RFFE interface architecture according to a first example embodiment of the invention.

Referring now to FIG. 2, a wireless communication unit 200 supporting a MIPI™ RFFE interface architecture according to a first example embodiment of the invention is illustrated. The wireless communication unit 200 includes at least one master device 202 and at least one slave device 204. The at least one master device 202 and at least one slave device 204 are connected via a shared control bus. In this example, the shared control bus includes a system clock 232, system data 234 and a shared RFFE interface supply voltage (VIO) 236 that is used both as an interface supply and asynchronous reset signal.

For ease of explanation, and to avoid obfuscating the description of the example concepts, the slave device 204 is illustrated as having a first die 210, e.g. a power amplifier (PA) die, and at least one second die 220, e.g. a high power RF switch die. However, it is envisaged that, in other examples, any number of die may be used, irrespective of the die functionality or application. In this example, the first die 210 includes a MIPI™ RFFE interface 212 and the second die 220 includes a simplified address decoder 222, instead of a MIPI™ RFFE interface. In this example, the first die 210 and the at least one second die 220 share a supply voltage (VDD) 230.

The first die 210 comprises the MIPI™ RFFE interface 212, which in turn, in some examples, includes a MIPI™ protocol controller circuit 214 that may be configured to assume responsibility to handle a correct decode of the MIPI™ unique slave identifier (USID, or sometimes referred to as a slave address) and the command sequence bits. In one example, the protocol controller circuit 214 is configured with a protocol decoder to decode a received frame on the system data 234 line. The MIPI™ protocol controller circuit 214 determines whether, and if so which, one or more second die may desire or need to decode the received frame on the system data 234 line. If the MIPI™ protocol controller circuit 214 determines that one or more second die may desire or need to decode the received frame on the system data 234 line, the MIPI™ protocol controller circuit 214 generates an enable signal 238 that is provided to the selected simplified address decoder 222 of the second die 220. In this manner, examples of the invention may benefit from a simplified version of the MIPI™ RFFE interface being provided in the second die 220, in that the second die 220 may only require one or more address decoder(s) and register(s), triggered to be woken up by the enable signal, as compared to the known use of a full MIPI™ RFFE interfaces in each second die. Thus, in some examples, the enable signal 238 may be used at the second die to ensure that anything outside of the correct time window is ignored, for example by holding a RESET condition until the enable signal 238 is activated.

In some examples, the first die 210 may be configured to just decode the slave address and command sequence bits in order to activate the enable signal 238 (e.g. set the enable signal 'high').

Thus, in some examples, a significantly reduced die size for the at least one second die may be achieved, in that a reduced-size second die 220 is selectively enabled by the MIPI™ RFFE interface 212 on the first die 210 to decode data received on the system data 234 line on the shared control bus.

In some examples, the enable signal 238 may be used as a signal to indicate a start of the address field that is part of the Command frame on the system data 234 line. In this manner, when the enable signal comprises 'start of frame' information, the simplified data address decoder 222 is able to synchronize received data packets or frames, e.g. to provide time alignment for enabling the second die 220 to effectively and correctly start to decode the received frame. In other example embodiments, for example when the concepts herein may be applied to MIPI RFFE extended register read/write commands, then the enable signal may be activated at the start of the Data Frame, which for these command types includes the register address field.

Figure 3:
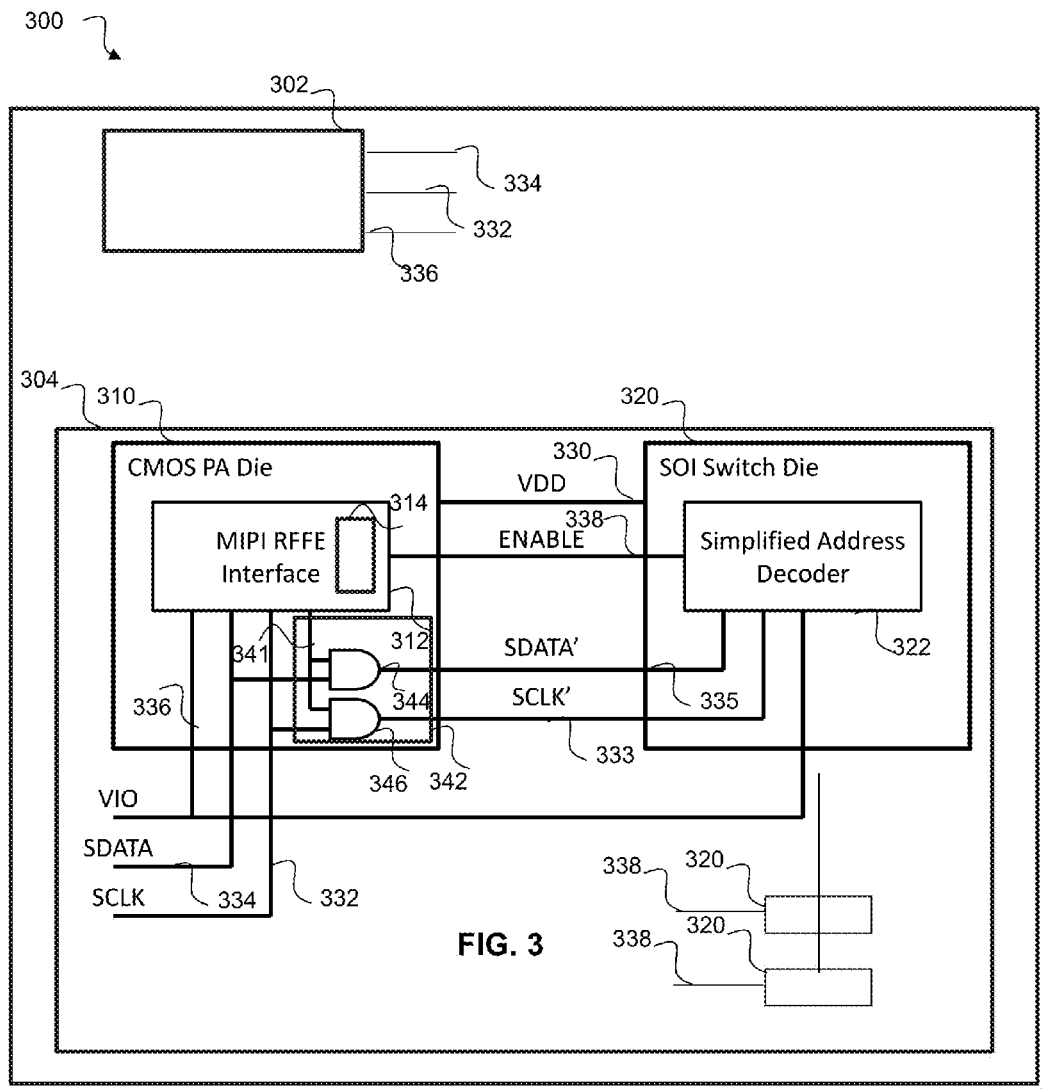
FIG. 3 illustrates a wireless communication unit supporting a MIPI™ RFFE interface architecture according to a second example embodiment of the invention.

Referring now to FIG. 3, a wireless communication unit 300 supporting a MIPI™ RFFE interface architecture according to a second example embodiment of the invention is illustrated. For ease of explanation, and to avoid obfuscating the description of the example concepts, the MIPI™ RFFE interface architecture is illustrated as having a first die 310, e.g. a power amplifier (PA) die and a second die, e.g. a high power RF switch die. However, it is envisaged that, in other examples, any number of die may be used, irrespective of the die functionality. In this example, the first die 310 includes a MIPI™ RFFE interface 312 and the second die 320 also includes a MIPI™ RFFE interface, which is advantageously in a form of a simplified address decoder 322.

In this example, the MIPI™ RFFE interface 312 is connected to a system clock 332, system data 334 and a shared RFFE interface supply voltage (VIO) 336. In FIG. 3, the first die 310 and second die 320 share a supply voltage (VDD) 330. However, in this example, the first die 310 and MIPI™ RFFE interface 312 have been adapted in accordance with example embodiments. In one example, the first die 310 includes a logic circuit 342. The logic circuit 342 is configured to provide gated MIPI™ data and clock signals to the simplified address decoder 322. In this manner, examples of the invention may benefit from a simplified version of the MIPI™ RFFE interface, in that, in some examples, it may only require one or more address decoder(s) and register(s). Thus, in this example, the second die 320 has also been adapted in accordance with example embodiments, in particular where the MIPI™ RFFE interface is implemented as a simplified address decoder 322 instead of a MIPI™ RFFE interface.

In some examples, the first die 310 may assume responsibility to handle a correct decode of the MIPI™ USID and command sequence bits such that a suitable gating signal 341 is correctly generated. The gating signal 341 controls the routing/distribution of a gated system data (SData) signal 335 and a gated system clock (SClk) signal 333.

In some examples, the logic circuit 342 may include a first AND gate 344 that is coupled to the data line 334. The controlling input to the first AND gate 344 is the gating signal 341, which, when in a logic 'high' state, allows the data line 334 signal to pass through the first AND gate 344 and form the gated data signal (SData') 335 to the simplified address decoder 322.

In some examples, the logic circuit 342 may include a second AND gate 346 that is coupled to the system clock 332 line. The controlling input to the second AND gate 346 is the gating signal 341, which, when in a logic 'high' state, allows the system clock 332 line signal to pass through the second AND gate 346 and form the gated system clock signal (SClk') 333 to the simplified address decoder 322.

Although the example in FIG. 3 illustrates the logic circuit 342 as including the first and second AND gates 344, 346 coupled to the system clock 332 line and the data line 334, it is envisaged that in other examples the logic circuit may include alternative logic components to generate the gated data signal (SData') 335 and gated system clock signal (SClk') 333.

In some examples, this architecture may facilitate a significantly reduced die size for the second die, for example the second die 320 that includes the simplified address decoder 322. In one example, the simplified address decoder 322 may be implemented using only a basic 3-wire serial-to-parallel interface (SPI) between multiple die. This SPI is a much simpler structure than routing data or commands on a full parallel interface, as far fewer communication lines and less complex circuitry is required.

In this example, a MIPI™ clock (CLK) signal may still be used for passing data to the second die. In this manner, there is no need for local clock generation. As may be appreciated, in other examples, the MIPI™ CLK signal 332 may be omitted in some example embodiments that use a communication scheme in which a clock signal is not used, or partly used across certain circuits and components located on one or more die.

In some examples, the first die 310 and MIPI™ RFFE interface 312 have also been adapted to output an enable signal 338 to the simplified RFFE address decoder 322. The enable signal 338 may be used as a signal to indicate a start of the address field, for the simplified address decoder 322 to synchronize received data packets or frames.

Clearly, the various components within the MIPI™ RFFE interface architecture 300 can be realized in discrete or integrated component form, with an ultimate structure therefore being application-specific or design-based.

Figure 4:
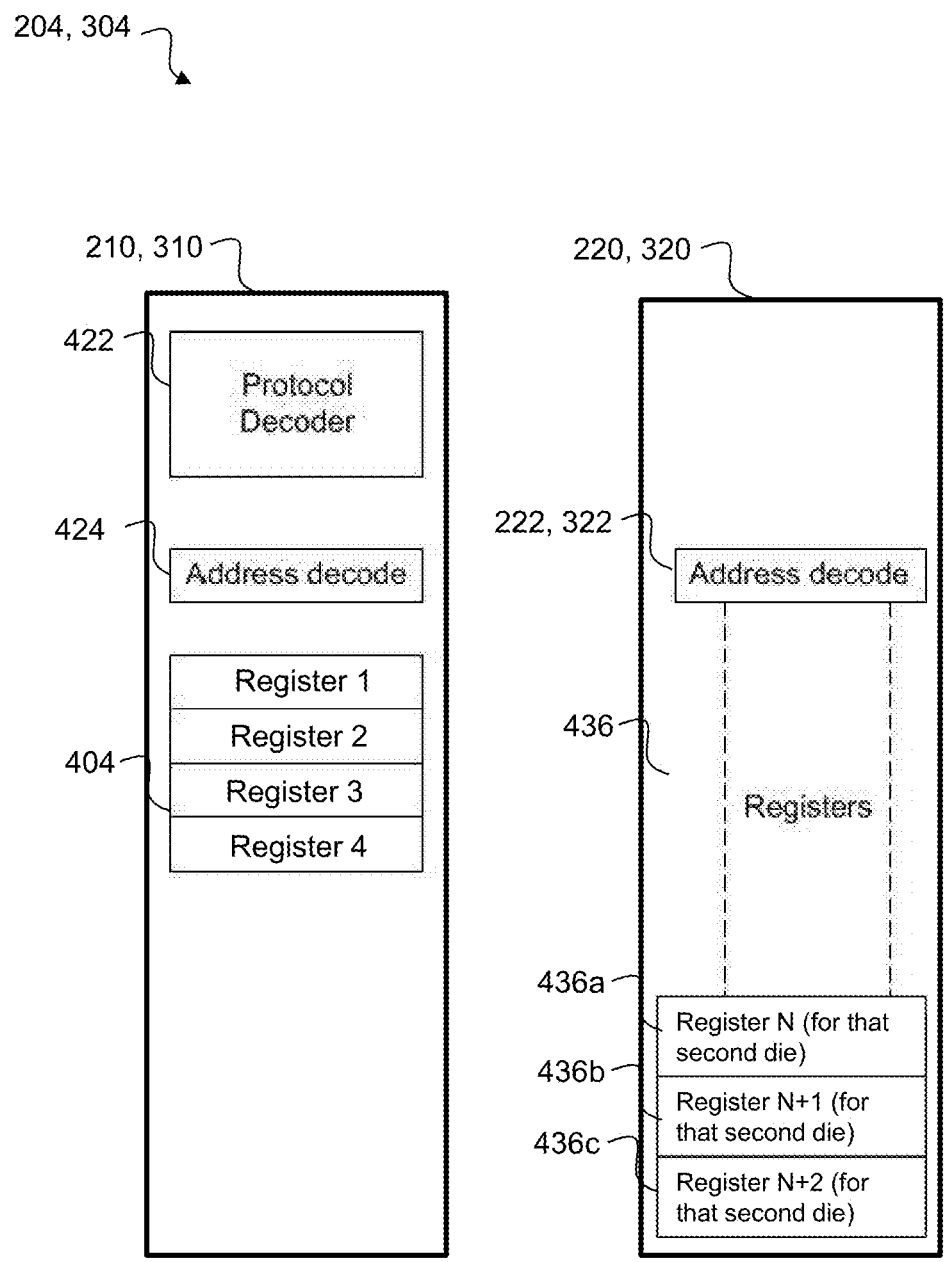
FIG. 4 illustrates an example overview of a MIPI™ RFFE slave device interface architecture according to example embodiments of the invention.

Referring now to FIG. 4, an example overview of a MIPI™ RFFE slave device interface architecture 204, 304, according to example embodiments of the invention is illustrated. The MIPI™ RFFE slave device interface architecture 204, 304 is illustrated as having a first die 210, 310, e.g. a power amplifier (PA) die, and at least one second die 220, 320, e.g. a high power RF switch die. In this example, the first die 210, 310, comprises a protocol decoder 422, such as a full MIPI™ RFFE protocol decoder and a reduced address decoder 424 with a reduced set of associated addresses 404, as compared to the known prior art of FIG. 1. Compared to a prior art example where a slave device implements the complete MIPI™ RFFE slave interface on a first die that distributes all control signals to the second die therefrom, in this example the same total number of registers may be split between the two die and, thus, the first die will implement fewer register addresses. In this example, the second die 220, 320 does not include a protocol decoder, and solely comprises a simplified address decoder 222, 322 and an associated (reduced) number of registers 436, for example comprising register N 436a, register N+1 436b, register N+2 436c, etc., related solely to that second die.

Although the simplified address decoder 222, 322 is only illustrated as being coupled to three registers 436a, 436b, 436c it is envisaged that in other examples more or fewer registers may be used.

Register data may be transferred to a selected register on, say, a falling edge of an Nth clock cycle, received following the rising edge of the ENABLE signal. In this example, parity bits may not be checked as it is assumed that a correct frame has been received, and hence during the $N^{th}$ cycle (the location of the data word parity bit), the register word is clocked into the register at the decoded address. If an error condition occurs, such that the frame is interrupted, a first die (such as first die 220 from FIG. 2) may configure a signal to stop the gating of the clock data, and trigger a new frame at the next rising edge inside simplified address decoder 222, 322.

In this example, only a MIPI™ write command is supported, which means that the implementation may be reduced to a simple shift register and an address decode circuit (or logic module). For example, the MIPI™ write command is a fixed length and contains a 6 bit address (including a parity bit for the whole command frame) and 9 bits of data (including parity). The data is sent one bit at a time, so a simple solution is to load the bits into a 15 bit shift register. As all 15 bits are kept together the address and data can be read, and if required the parity bits as well. The address bits may then be used to select which register to store the data into.

In other examples, it is envisioned that a read command (as well as other command structures) can be supported with a minor extension of functionality of the simplified address decoder, as would be appreciated by a skilled artisan.

Figure 1:
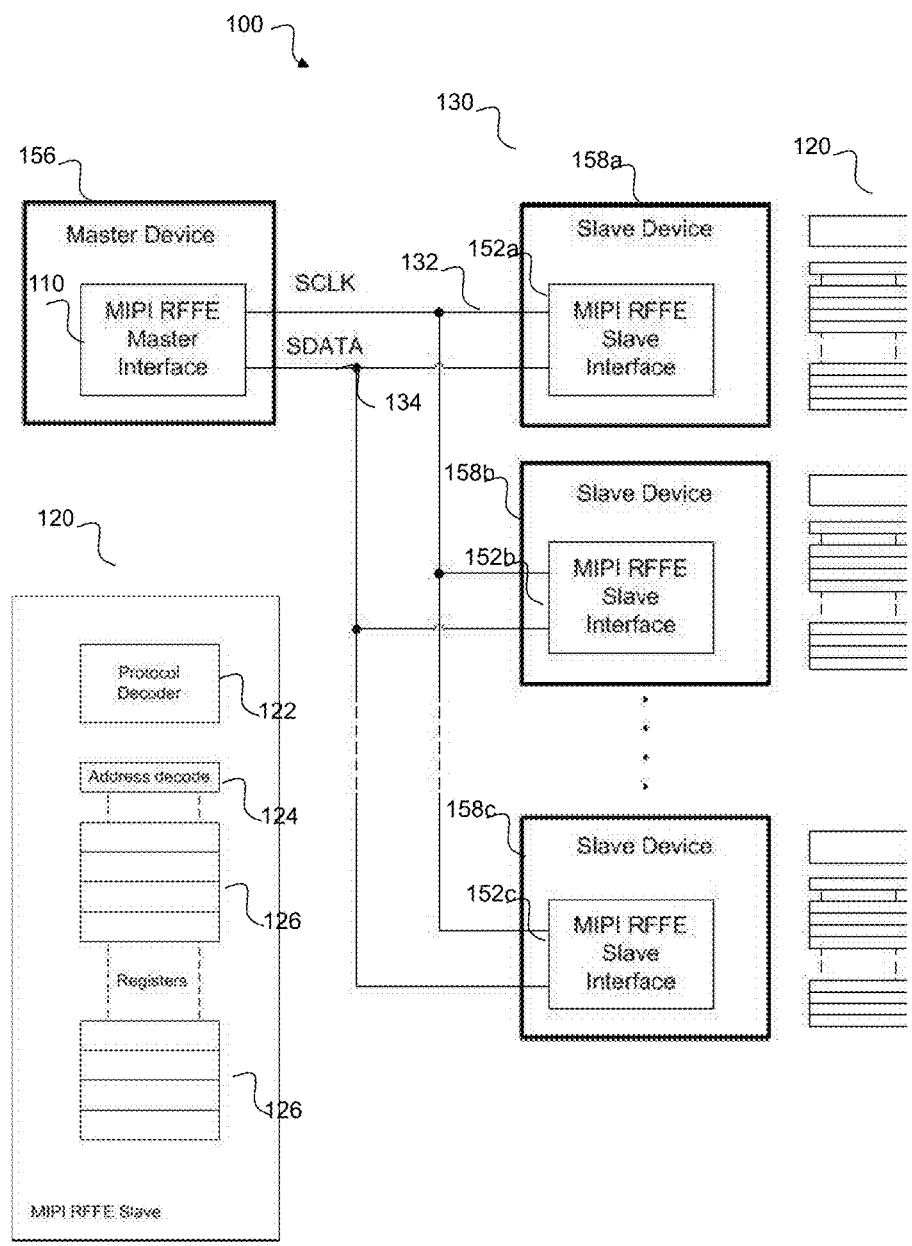
FIG. 1 illustrates a known MIPI™ RFFE interface architecture.

In this manner, examples of the invention may benefit from a simplified version of an MIPI™ RFFE interface, in that, in some examples, it may only require one or more address decoder(s) and register(s) in the second die, but much fewer registers as compared to the known full MIPI™ RFFE architecture of FIG. 1.

Referring now to FIG. 5, an example frame structure 500 and gating of control signals in an MIPI™ RFFE interface architecture is illustrated, according to example embodiments of the invention. The example frame structure 500 in FIG. 5 is just one type of frame that the MIPI™ RFFE standard defines, with the illustrated one being for a 'Register Write'. The example frame structure 500 includes an enable signal 502, a system clock signal (SCLK) 504 and a system data signal (SDATA) 506. The SDATA 506 commences with a sequence start condition (SSC) 508. The SSC 508 is the synchronisation method used to identify the start of every frame. A 'Command Frame' 510, which comprises one data frame of 13 bits for a single byte register write, is always the first frame that is sent on the shared control bus after the SSC 508. All command frames 510 start with four slave address (SA) bits 512, which identify the slave device that the command is being sent to. In the case of a 'register write' frame, the next three bits placed on the shared control bus are '010' 514, as shown. The full MIPI™ interface function is allocated a unique Slave identifier (USID). Decoding of the slave address in a first die, is instigated by the protocol decoder, for example located in a controller, such as protocol controller circuit 214 of FIG. 2, on a first die. If the four SA bits 512 match the USID and the next three bits are 010, then this frame is intended for the slave and it is identified as a 'Register Write' frame. At this point an ENABLE control line is set high, for example an enable signal 502 is sent, by the first die to the second die to indicate signals to be shared with the second die. In particular, the protocol decoder on the first die has determined those data frames that should be decoded by the at least one second die, and enabled the at least one second die to decode those data frames. Advantageously, the at least one second die does not need to detect SSC, check the SA bits or check if the command is a 'register write' frame, as the full MIPI™ protocol interface in the first die has already done that for each of the at least one second die. In this example, the second die includes a simplified slave, such as a slave that includes a simplified address decoder 222, 322 of FIG. 2 and FIG. 3. The second die only needs to receive the address 516, data 520 and parity bits 518 (identified as 'P' in FIG. 5) and, if the address is stored in the second die, use them to set a correct register.

Figure 6:
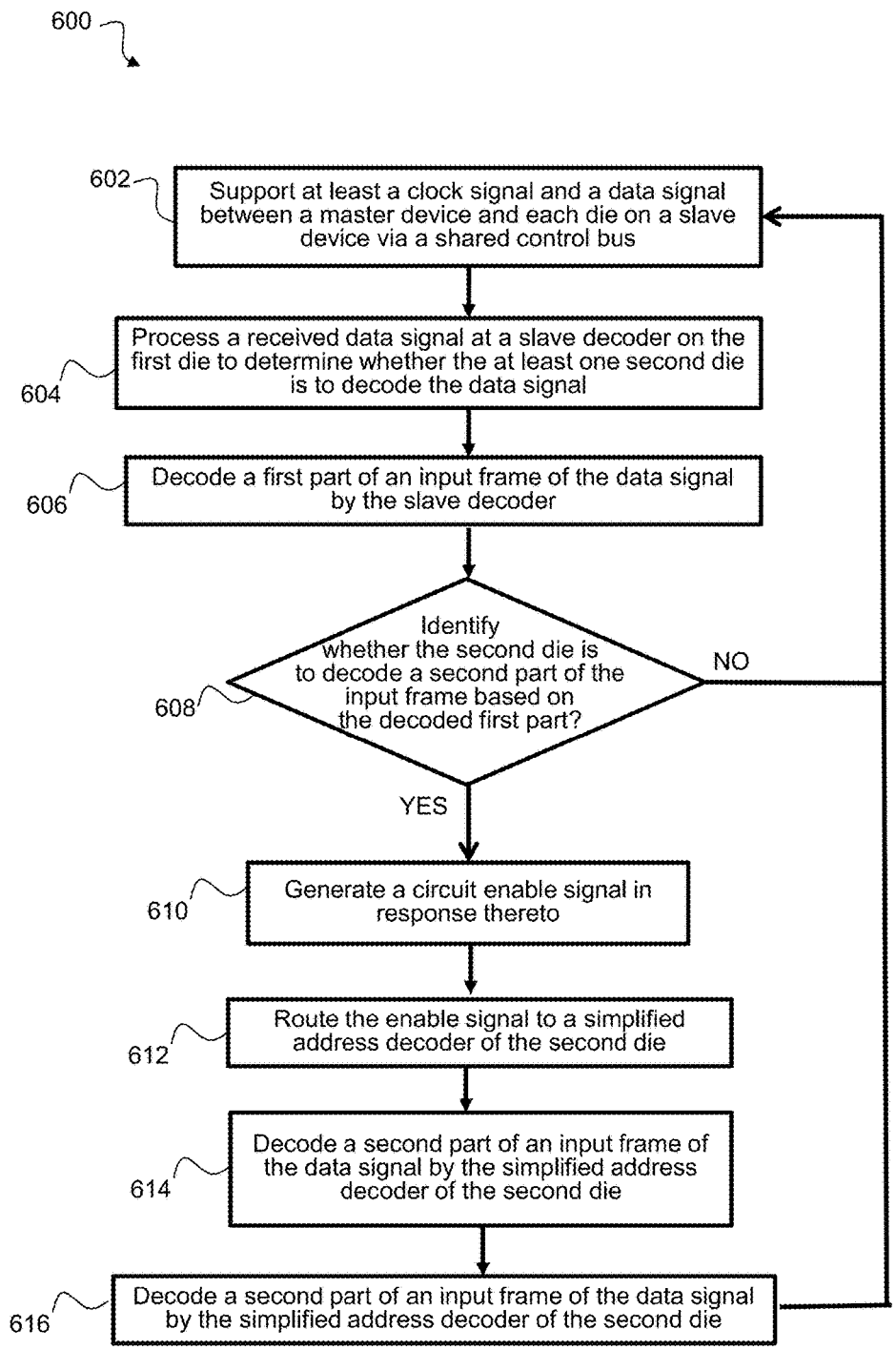
FIG. 6 illustrates an example method of operation of an MIPI™ RFFE interface architecture that includes multiple die according to example embodiments of the invention.

Referring now to FIG. 6, an example method 600 of an operation of a system supporting an MIPI™ RFFE interface that includes a master device and at least one slave device having multiple die is illustrated, according to example embodiments of the invention. The at least one slave device comprises a first die comprising a decoder configured to support a MIPI™ RFFE slave protocol and at least one second die comprising a simplified address decoder and operably coupled to the first die. The method comprises supporting at least a clock signal and a data signal between the master device and the at least one second die on the slave device via a shared control bus, at 602. The method further comprises processing the data signal at the slave decoder on the first die to determine whether the at least one second die is to decode the data signal at 604. The method further comprises generating, at the first die, a circuit enable signal, at 610.

In some optional examples, the method may further comprise decoding a first part of an input frame of the data signal by the slave decoder, at 606. In some optional examples, the method may further comprise identifying whether the at least one second die is to decode a second part of the input frame based on the decoded first part, as in 608. In this optional example, the method then further comprises generating, at the first die, a circuit enable signal in 610, in response to the determination in 608.

At 612, the first die routes the circuit enable signal to a simplified address decoder of the at least one second die. In response to being enabled, the second die processes the clock signal and the data signal by the simplified address decoder at 614. In some optional examples, the processing at 614 may comprise enabling the at least one second die to decode the second part of the data signal in response to the at least one circuit enable signal, in 616.

Advantageously, example embodiments of the present invention may reduce the die size and therefore cost associated with known slave devices having multiple die. For example, the proposed partitioning of functionality for protocol decoding to be located only in a first die in the slave device having the protocol decoder, with the remaining functionality provided by a (second) die having a simplified address decoder, and in some examples a reduced number of associated addresses linked to that second die, has been found to reduce the interface implementation size in the second die by a factor of twelve when compared to a known architecture, such as illustrated in FIG. 1. In some example embodiments, there is a cost saving in each die as a consequence of each die no longer requiring the need to implement full protocol decoding, and thus each die requiring a full MIPI™ RFFE protocol decoder.

Examples of the invention utilize a simplified 'address decoder'. The general structure of an address decoder is logic that converts a binary code of 'n' bits and a set of $2^n$ controls that select the address. Therefore, for the smallest possible address decoder where there is one address bit 'A', the decoder produces two select signals S1 and S0 where: S1=A, and S0=NOT A. For two address bits we have A1 and A0 and require four select signals S3, S2, S1 and S0. This decoder would consist of two NOT logic gates and four AND gates logic gates, as would be appreciated by a skilled person. Thus, it is known that address decoder complexity increases rapidly with 'n'. Thus, by having a smaller number of registers in the second die, it is possible to limit 'n'. This benefit is why the address decoder in the slave device second die is referred to as 'simplified'.

It is envisaged that the aforementioned inventive concept can be applied by a semiconductor manufacturer to any radio frequency module comprising radio frequency components or circuits, such as a master device and a slave device comprising a first die supporting a MIPI™ RFFE protocol and one or more second die comprising an address decoder and associated registers. It is further envisaged that, for example, a semiconductor manufacturer may employ the inventive concept in a design of a stand-alone radio frequency module or application-specific integrated circuit (ASIC) or may implement the concepts herein described in any other sub-system element.

However, it will be appreciated by a skilled artisan that the inventive concept herein described may be embodied in any type of wireless communication unit, such as those used in mobile phone communications, radar applications and/or military, civil and land mobile radio applications, to name by a few potential applications. In some examples, die may be constructed using one or more of the following technologies: silicon on insulator (SOI), silicon on sapphire (SOS), gallium arsenide (GaAs), or Micro-Electro-Mechanical Systems (MEMS), etc.

It will be appreciated that any suitable distribution of functionality between different functional units, for example with respect to the integrated circuits, may be used without detracting from the invention. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved system, as implemented in a wireless communication unit such as a smartphone, comprising multiple die, e.g. a master device, a slave device that includes a first die that includes an interface supporting a MIPI™ RFFE protocol using a protocol decoder, and a second die that includes a simplified version of a MIPI™ RFFE interface architecture, have been described, wherein the aforementioned disadvantages with prior art arrangements have been substantially alleviated.

We claim:

1. A system comprising:
   a master device;
   a slave device having:
      a first die comprising an interface having a slave decoder configured to support a MIPI™ radio frequency front end, RFFE, slave protocol; and
      at least one second die, comprising a simplified address decoder, operably coupled to the first die; and
   a shared control bus configured to support at least a clock signal and a data signal shared between the master device, first die and the at least one second die on the slave device;
   wherein the interface of the first die is configured to generate at least one circuit enable signal routed to the at least one second die and the simplified address decoder of the at least one second die is configured to process the clock signal and the data signal in response to the at least one circuit enable signal.

2. The system of claim 1 wherein the at least one second die is enabled to decode the data signal using the processed clock signal in response to the at least one circuit enable signal.

3. The system of claim 1 wherein the slave decoder is implemented on only the first die and configured to decode a first part of an input frame of the data signal comprising a command frame having at least one of: a synchronisation field, a slave address field, and at least one command.

4. The system of claim 3 wherein the slave decoder is configured to identify whether the at least one second die is to decode a second part of the input frame based on the decoded first part, and generates the at least one circuit enable signal in response thereto.

5. The system of claim 4 wherein the second part of the input frame of the data signal comprises an address field and a data field to be decoded by the at least one second die.

6. The system of claim 1 wherein the first die comprises a first logic circuit coupled to the MIPI™ RFFE interface and configured to receive the clock signal and data signal from the shared bus and provide a gated version of the clock signal and data signal to the at least one second die.

7. The system of claim 1 further comprising multiple second die, each of the multiple second die comprising at least one storage element coupled to a respective simplified address decoder.

8. The system of claim 7 wherein the same enable signal is applied across multiple second die.

9. A method of operating a system comprising a master device and at least one slave device wherein the at least one slave device comprises a first die comprising a decoder configured to support a MIPI™ RFFE slave protocol and at least one second die comprising a simplified address decoder and operably coupled to the first die, the method comprising:
   supporting at least a clock signal and a data signal between the master device and the at least one second die on the slave device via a shared control bus;
   processing the data signal at the slave decoder on the first die to determine whether the at least one second die is to decode the data signal;
   generating, at the first die, a circuit enable signal;
   routing the circuit enable signal to the at least one second die;
   processing the clock signal and the data signal by the simplified address decoder in response to the circuit enable signal.

10. The method of claim 9 further comprising:
    decoding a first part of an input frame of the data signal by the slave decoder;
    identifying whether the at least one second die is to decode a second part of the input frame based on the decoded first part; and
    generating the at least one circuit enable signal in response thereto.

11. The method of claim 10 further comprising enabling the at least one second die to decode the data signal in response to the at least one circuit enable signal.

12. The method of claim 10 wherein the second part of the input frame of the data signal comprises an address field and a data field to be decoded by the at least one second die.

13. A wireless communication unit comprising:
    a master device;
    a slave device, comprising:
       a first die comprising an interface having a slave decoder configured to support a MIPI™ radio frequency front end, RFFE, slave protocol;
       at least one second die, comprising a simplified address decoder, operably coupled to the first die; and
    a shared control bus configured to support at least a clock signal and a data signal shared between the master device, first die and the at least one second die on the slave device;
    wherein the interface of the first die is configured to generate at least one circuit enable signal routed to the at least one second die and the simplified address decoder of the at least one second die is configured to process the clock signal and the data signal in response to the at least one circuit enable signal.

14. The wireless communication unit of claim 13 wherein the at least one second die is enabled to decode the data signal using the processed clock signal in response to the at least one circuit enable signal.

15. The wireless communication unit of claim 13 wherein the slave decoder is implemented on only the first die and configured to decode a first part of an input frame of the data signal comprising a command frame having at least one of: a synchronisation field, a slave address field, and at least one command.

16. The wireless communication unit of claim 15 wherein the slave decoder is configured to identify whether the at least one second die is to decode a second part of the input frame based on the decoded first part, and generates the at least one circuit enable signal in response thereto.

17. The wireless communication unit of claim 16 wherein the second part of the input frame of the data signal comprises an address field and a data field to be decoded by the at least one second die.

18. The wireless communication unit of claim 13 wherein the first die comprises a first logic circuit coupled to the MIPI™ RFFE interface and configured to receive the clock signal and data signal from the shared bus and provide a gated version of the clock signal and data signal to the at least one second die.

19. The wireless communication unit of claim 13 further comprising multiple second die, each of the multiple second die comprising at least one storage element coupled to a respective simplified address decoder.

20. The wireless communication unit of claim 19 wherein the same enable signal is applied across multiple second die.

* * * * *